(12) United States Patent
Zhong

(10) Patent No.: US 8,509,622 B2
(45) Date of Patent: Aug. 13, 2013

(54) OPTICAL MODULE AND OPTICAL COMMUNICATION SYSTEM

(75) Inventor: Yangfan Zhong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 305 days.

(21) Appl. No.: 13/050,634

(22) Filed: Mar. 17, 2011

(65) Prior Publication Data

US 2011/0293284 A1 Dec. 1, 2011

(30) Foreign Application Priority Data

May 27, 2010 (CN) .......................... 2010 1 0187497
Feb. 12, 2011 (WO) ................ PCT/CN2011/070952

(51) Int. Cl.
*H04B 10/00* (2013.01)
(52) U.S. Cl.
USPC .......................................... 398/117; 398/135
(58) Field of Classification Search
USPC .................. 398/115–117, 135–139
See application file for complete search history.

(56) References Cited

U.S. PATENT DOCUMENTS

| 7,229,221 | B2 | 6/2007 | Ahrens |  |
|---|---|---|---|---|
| 7,457,126 | B2 | 11/2008 | Ahrens |  |
| 7,637,672 | B1 * | 12/2009 | Li et al. ............... | 385/92 |
| 2005/0162761 | A1 | 7/2005 | Hargis et al. |  |
| 2011/0293284 | A1 | 12/2011 | Zhong |  |

FOREIGN PATENT DOCUMENTS

| CN | 2519585 Y | 10/2002 |
| CN | 101034939 A | 9/2007 |
| CN | 101154997 A | 4/2008 |
| CN | 101573022 A | 11/2009 |
| CN | 101872042 A | 10/2010 |
| CN | 101998801 | 3/2011 |
| WO | WO 2007/047469 A2 | 4/2007 |
| WO | WO 2011/147208 A1 | 12/2011 |

OTHER PUBLICATIONS

International Search Report and Written Opinion of the International Searching Authority issued in corresponding PCT Patent Application No. PCT/CN2011/070952, mailed May 19, 2011.
Office Action issued in corresponding Chinese Patent Application No. 201010187497.4, mailed Aug. 12, 2011.
Office Action issued in corresponding Chinese Patent Application No. 201010187497.4, mailed Mar. 15, 2011.

* cited by examiner

*Primary Examiner* — Leslie Pascal
(74) *Attorney, Agent, or Firm* — Brinks Hofer Gilson & Lione

(57) ABSTRACT

The present disclosure discloses an optical module and optical communication system. The optical module includes an upper housing (210), a printed circuit board (220), and an integrated chip (240) and an optical transceiver module (250) arranged on the printed circuit board, the upper housing (210) and the lower housing (230) together forming a space accommodating the printed circuit board (220), the integrated circuit board (240), and the optical transceiver module (250), and a first flexible thermally conductive component (260) arranged between the printed circuit board (220) and the lower housing (230). One surface of the first flexible thermally conductive component (260) is contacted with the integrated chip (240), and another surface of the first flexible thermally conductive component (260) is contacted with the lower housing (230). The optical module provided by the present disclosure has good heat dissipation performance and relatively high reliability.

17 Claims, 5 Drawing Sheets

OPTICAL MODULE AND OPTICAL COMMUNICATION SYSTEM

CROSS-REFERENCE TO RELATED APPLICATIONS

This application claims priority to Chinese Patent Application No. 201010187497.4, filed on May 27, 2010, and International Patent Application No. PCT/CN2011/070952, filed on, both of which are hereby incorporated by reference in their entireties.

FIELD OF THE DISCLOSURE

The present disclosure relates to the technical field of heat dissipation, in particular to an optical module and optical communication system.

BACKGROUND OF THE DISCLOSURE

With the increases of the power consumptions of the electronic devices, the heat dissipation technology has become a key technology supporting the further development of the electronic technology. An optical module is an active photoelectronic device implementing photo-to-electrical conversion and electrical-to-photo conversion and an important functional module of an optical communication device. With the continuous improvement of technical indexes such as the bandwidth and the transmission distance of the optical communication device, the requirements for the performance and integrated level of the optical module are higher and higher, and the power consumption of the optical module is also becoming higher than before. Therefore, it is necessary to enhance the heat dissipation performance of the optical module.

Referring to FIG. 1, it is a schematic diagram depicting the structure of the optical module in prior art.

A current optical module mainly includes an upper housing 110, a printed circuit board 120, a heat dissipation boss 130, a lower housing 140, and an integrated chip 150 and an optical transceiver module 160. The upper housing 110 and the lower housing 140 together form a space accommodating the printed circuit board 120, the heat dissipation boss 130, the integrated chip 150, and the optical transceiver module 160. The heat dissipation boss 130 is disposed between the lower housing 140 and the printed circuit board 120. The heat dissipation boss 130 includes a plurality of heat dissipation protrusions 131 and 132. The integrated chip 150 is disposed on the surface of the printed circuit board 120, where the surface of the printed circuit board 120 is close to the heat dissipation boss 130. The heat dissipation boss 130 contacts the integrated chip 150 to transfer the heat produced by the integrated chip to the lower housing 140.

In studying the prior arts, the inventors find that: There are plural integrated chips disposed on a current printed circuit board, and since the heights of these integrated chips are inconsistent, the integrated chips cannot fully contact the heat dissipation protrusions on the heat dissipation boss. As such, the heat produced by the integrated chips cannot be dissipated in time. This results in a temperature rise of the inner air, and affects the normal operation of the low standard devices (such as the optical transceiver module), thus lowering the reliability of the optical module.

SUMMARY OF THE DISCLOSURE

In one aspect, the embodiments of the present disclosure provide an optical module to improve the inner heat dissipation of an optical module, thereby enhancing the reliability of the optical module.

In another aspect, the embodiments of the present disclosure provide an optical communication system to improve the inner heat dissipation of an optical module, thereby enhancing the reliability of the system.

The optical module as provided by the embodiments of the present disclosure includes an upper housing (210), a printed circuit board (220), a lower housing (230), and an integrated chip (240) and an optical transceiver module (250) arranged on the printed circuit board, wherein the upper housing (210) and the lower housing (230) together form a space accommodating the printed circuit board (220), the integrated chip (240), and the optical transceiver module (250); and a first flexible thermally conductive component (260) arranged between the printed circuit board (220) and the lower housing (230), one surface of the first flexible thermally conductive component (260) being contacted with the integrated chip (240), and another surface of the first flexible thermally conductive component (260) being contacted with the lower housing (230), where the two surfaces are opposite to each other.

The optical communication system as provided by the embodiments of the present disclosure includes a data source, an optical channel, and the optical module as described above, wherein the data source is configured to transmit data signals to the optical module, and the optical transceiver module of the optical module is configured to convert the data signals into optical signals and transmit the optical signals via the optical channel.

In the embodiments of the present disclosure, by providing a first flexible thermally conductive component between the printed circuit board and the lower housing, fully filling the space between the integrated chip and the lower housing using the fluidity of the first flexible thermally conductive component, and squeezing air inside the optical module, such that the first flexible thermally conductive component may fully contact the printed circuit board and the integrated chip, the heat generated by the integrated chip may be transferred to the lower housing and dissipated through the first flexible thermally conductive component. This improves the heat dissipation performance of the optical module and enhances the reliability of the optical module.

BRIEF DESCRIPTION OF THE FIGURES

To more clearly illustrate the technical solutions of the embodiments of the present disclosure or the prior art, brief introduction to the accompanying drawings to be used in describing the embodiments and the prior art will be given in the following. Obviously, the accompanying drawings are merely some embodiments of the present disclosure. For those of ordinary skill in the art, other accompanying drawings may be obtained without inventive labor according to these accompanying drawings.

DETAILED DESCRIPTION OF THE EMBODIMENTS

In the following, reference will be made to the accompany drawings illustrating the embodiments of the present disclosure to clearly and completely describe the technical solutions of the embodiments of the present disclosure. Obviously, the embodiments as shown are only a part, but not all, of the embodiments of the present disclosure. All other embodiments made by those of ordinary skill in the art based on the embodiments of the present disclosure, without the expenditure of inventive labor, fall within the scope of the present disclosure.

The embodiments of the present disclosure provide an optical module. The optical module includes an upper housing, a printed circuit board, a lower housing, and an integrated chip and an optical transceiver module arranged on the printed circuit board, where the upper housing and the lower housing together form a space accommodating the printed circuit board, the integrated chip, and the optical transceiver module, and the optical module further includes a first flexible thermally conductive component disposed between the printed circuit board and the lower housing. One surface of the first flexible thermally conductive component is contacted with the integrated chip, and another surface of the first flexible thermally conductive component being contacted with the lower housing.

The optical module as provided by the embodiments of the present disclosure, by providing a first flexible thermally conductive component between the printed circuit board and the lower housing, fully filling the space between the integrated chip and the lower housing using the fluidity of the first flexible thermally conductive component, and squeezing air inside the optical module, such that the first flexible thermally conductive component may fully contact the printed circuit board and the integrated chip, may transfer the heat generated by the integrated chip to the lower housing and dissipate it through the first flexible thermally conductive component. This improves the heat dissipation performance of the optical module and enhances the reliability of the optical module.

To facilitate a better understanding of the embodiments of the present disclosure, reference will be made to the accompany drawings to describe in detail the embodiments as provided by the present disclosure.

Figure 1:
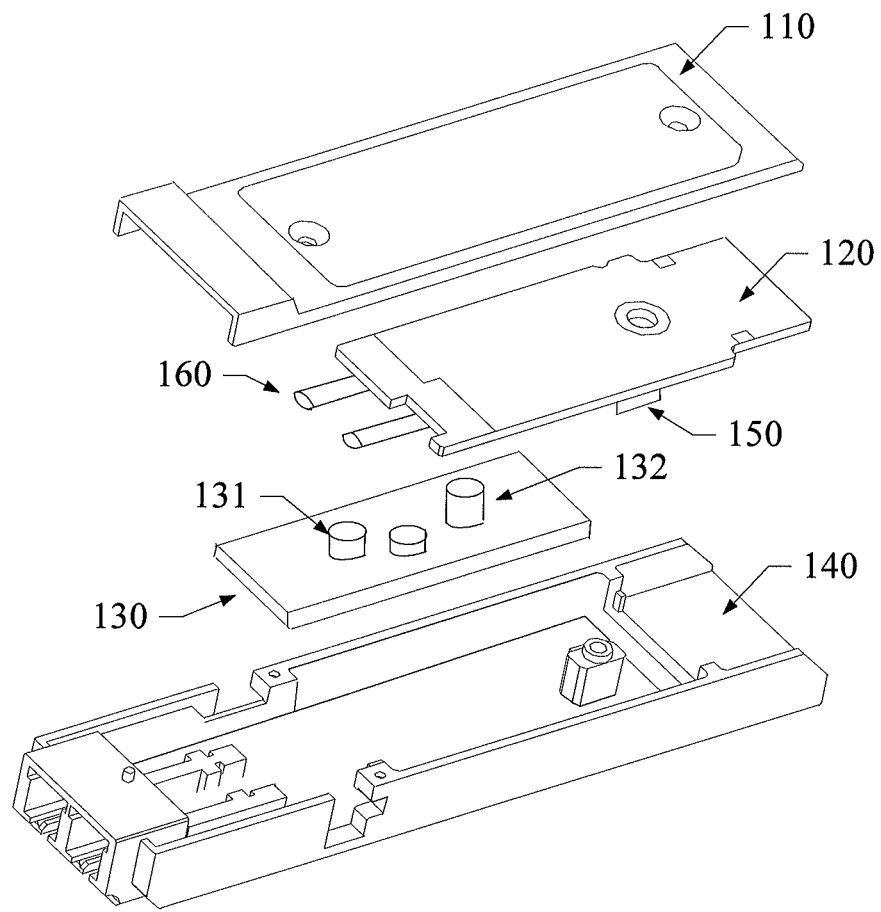
FIG. 1 is a schematic diagram depicting the structure of an optical module according to the prior arts.
Figure 2:
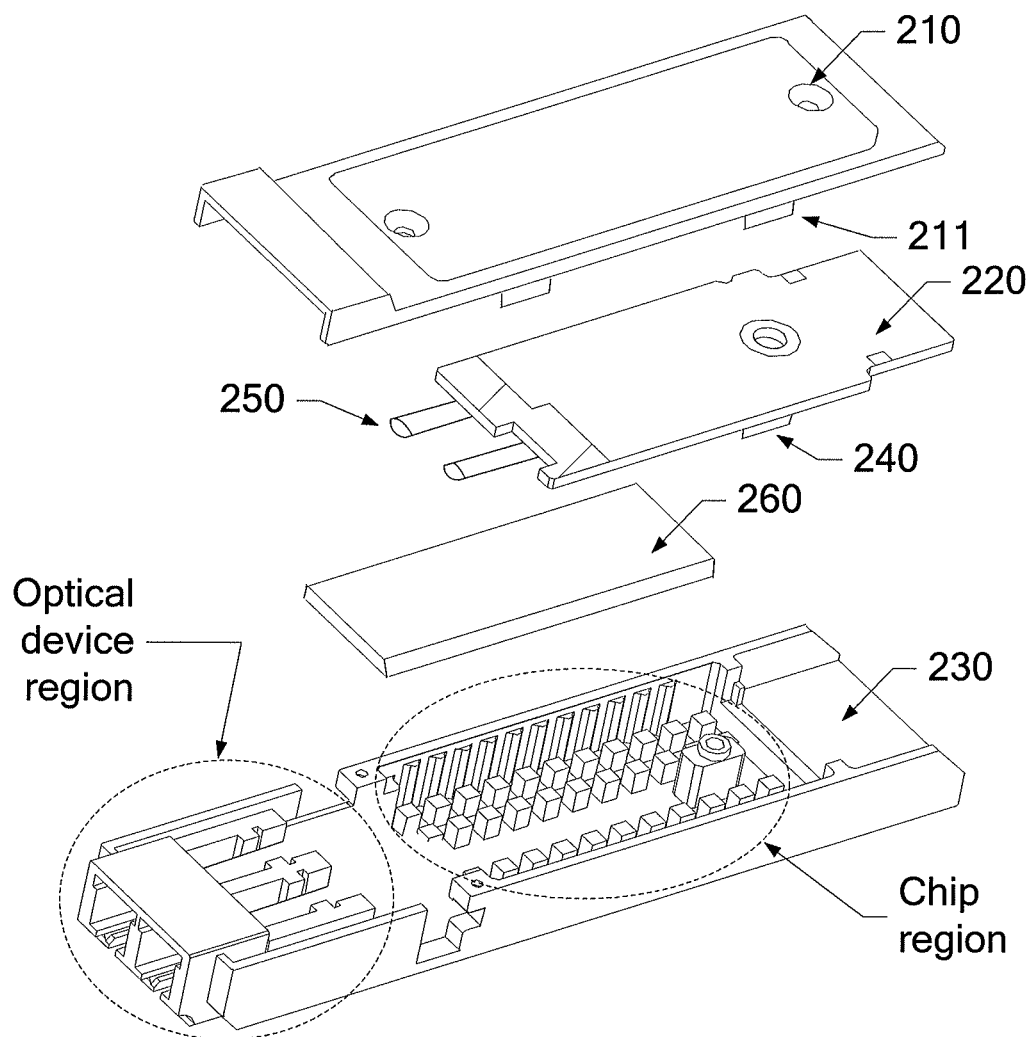
FIG. 2 is a schematic diagram depicting the structure of an optical module according to the first embodiment of the present disclosure.

Referring to FIG. 2, it is a schematic diagram depicting the structure of the optical module as provided by the first embodiment of the present disclosure.

In the embodiment of the present disclosure, the optical module includes an upper housing 210, a printed circuit board 220, a lower housing 230, and an integrated chip 240 and an optical transceiver module 250 arranged on the printed circuit board, where the upper housing 210 and the lower housing 230 together form a space accommodating the printed circuit board 220, the integrated chip 240, and the optical transceiver module 250. A first flexible thermally conductive component 260 is disposed between the printed circuit board 220 and the lower housing 230. One surface of the first flexible thermally conductive component 260 is contacted with the integrated chip 240, and another surface of the first flexible thermally conductive component 260 is contacted with the lower housing 230. The embodiments of the present disclosure fully fill the space between the integrated chip 240 and the lower housing 230 using the fluidity of the first thermally conductive component 260, and may squeeze the air inside the optical module, thus transferring the heat generated by the integrated chip 240 to the lower housing and dissipate it.

As illustrated by the dotted regions in FIG. 2, in the chip region, the embodiments of the present disclosure use a first flexible thermally conductive material 260 to fully fill the space between the integrated chip 240 and the lower housing 230, and squeeze the air inside the optical module. By exploiting the heat conduction characteristics of the first flexible thermally conductive material 260, huge amounts of heat generated by the chip region may be isolated from the region of optical components. This mitigates the influence of the high temperature chip region on the low temperature standard optical devices. The embodiments of the present disclosure may enhance the temperature standard of the optical module and enhance the overall operating reliability.

The first flexible thermally conductive component 260 may be a heat-conducting gel, a heat-conducting silicon grease, or a heat-conducting fin, etc. The first flexible thermally conductive component also has very good amortization characteristics, capable of sufficiently protecting the components in the optical module and preventing them from being damaged in transmission and use.

In the embodiments of the present disclosure, the integrated chip 240 is disposed on a surface of the printed circuit board 220, where the surface of the printed circuit board 220 is close to the first flexible thermally conductive component 260. Correspondingly, by providing the integrated chip 240 on the surface of the printed circuit board 220 distant from the first flexible thermally conductive component 260, the embodiments of the present disclosure may dissipate the heat generated by the integrated chip 240 through the first flexible thermally conductive component 260 and the lower housing 230, which further improves the heat dissipation performance.

In the embodiments of the present disclosure, by providing a first flexible thermally conductive component 260 between the printed circuit board 220 and the lower housing 230, exploiting the fluidity of the first flexible thermally conductive component 260 for fully filling the space between the integrated chip 240 and the lower housing 230, and squeezing the air inside the optical module, the first flexible thermally conductive module 260 may fully contact the printed circuit board 220 and the integrated chip 240, and thus the heat generated by the integrated chip 240 may be transferred in time through the first flexible thermally conductive component 260 to the lower housing 230 and dissipated. This improves the heat dissipation performance of the optical module and enhances the reliability of the optical module. Secondly, since the inner dissipation of the optical module is improved, it is not necessary to use current costly heat dissipation approaches for the heat dissipation outside the optical module, which lowers the heat dissipation cost.

In addition, since the heat dissipation boss is cancelled in the embodiments of the present disclosure, there is no need to fabricate a complex boss. Therefore, the production efficiency may be increased remarkably, while at the same time the costs are significantly lowered. In the optical module as provided by the embodiments of the present disclosure, the first surface of the upper housing 210 includes at least one protrusion 211, where the first surface of the upper housing 210 is close to the printed circuit board 220. At the time of assembling the optical module, the upper housing 210 pushes up the printed circuit board 220 by the protrusions 211, thus transferring a stress from the printed circuit board 220 to the first flexible thermally conductive component 260 and pressing against the first flexible thermally conductive component 260, such that the first flexible thermally conductive component 260 contacts well with the printed circuit board 220. This may more effectively transfer the heat generated by the chip 240. The number of the protrusions on the first surface of the upper housing 210 may be determined according to actual needs.

Figure 3:
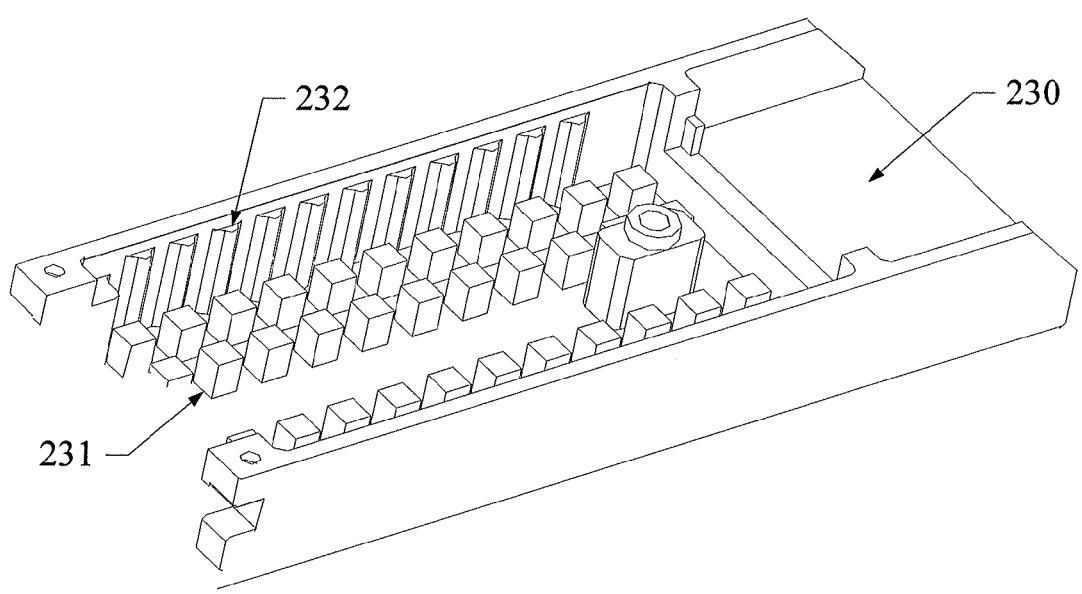
FIG. 3 is partial enlarged view of the lower housing in the optical module according to the embodiments of the present disclosure.

Referring to FIG. 3, it is a partial enlarged view of the lower housing of the optical module as provided by the embodiments of the present disclosure.

In the optical module provided by the embodiments of the present disclosure, the second surface of the lower housing 230 includes at least a protrusion 231, where the second surface of the lower housing 230 is close to the first flexible thermally conductive component 260, and the number and the disposition of the protrusions 231 on the second surface of the lower housing 230 may be determined according to actual needs. The shape of the protrusions 231 may be cylindrical, needle-like, or other shapes. By providing protrusions 231 on the second surface of the lower housing 230, heat dissipation of the first flexible thermally conductive component 260 may be expedited, which further facilitates the heat dissipation of the optical module.

Further, the plural protrusions 231 on the second surface (i.e., the inner surface of the lower housing) of the lower housing 230 may be heat exchange teeth. By pressing against the first flexible thermally conductive component 260, the heat exchange teeth are entirely embedded into the first flexible thermally conductive component 260. This increases the contact between the lower housing 230 and the first flexible thermally conductive component. Further, the heat exchange teeth contact the air and exchange heat therewith. This enhances the heat-conducting capabilities of the integrated chip 240 and the lower housing 230, and further facilitates the heat dissipation of the optical module.

In the embodiments of the present disclosure, there are tooth-like protrusions distributed on the third and fourth surfaces of the lower housing 230, where the third and fourth surfaces of the lower housing 230 are intersected with the second surface of the lower housing 230. The shape of the tooth-like protrusions may be designed according to actual needs. The tooth-like protrusions 232 may be used for fixing the first flexible thermally conductive component 260, increasing the friction between the first flexible thermally conductive component 260 and the lower housing to prevent the slippage thereof and enhance the reliability of the optical module.

Figure 4:
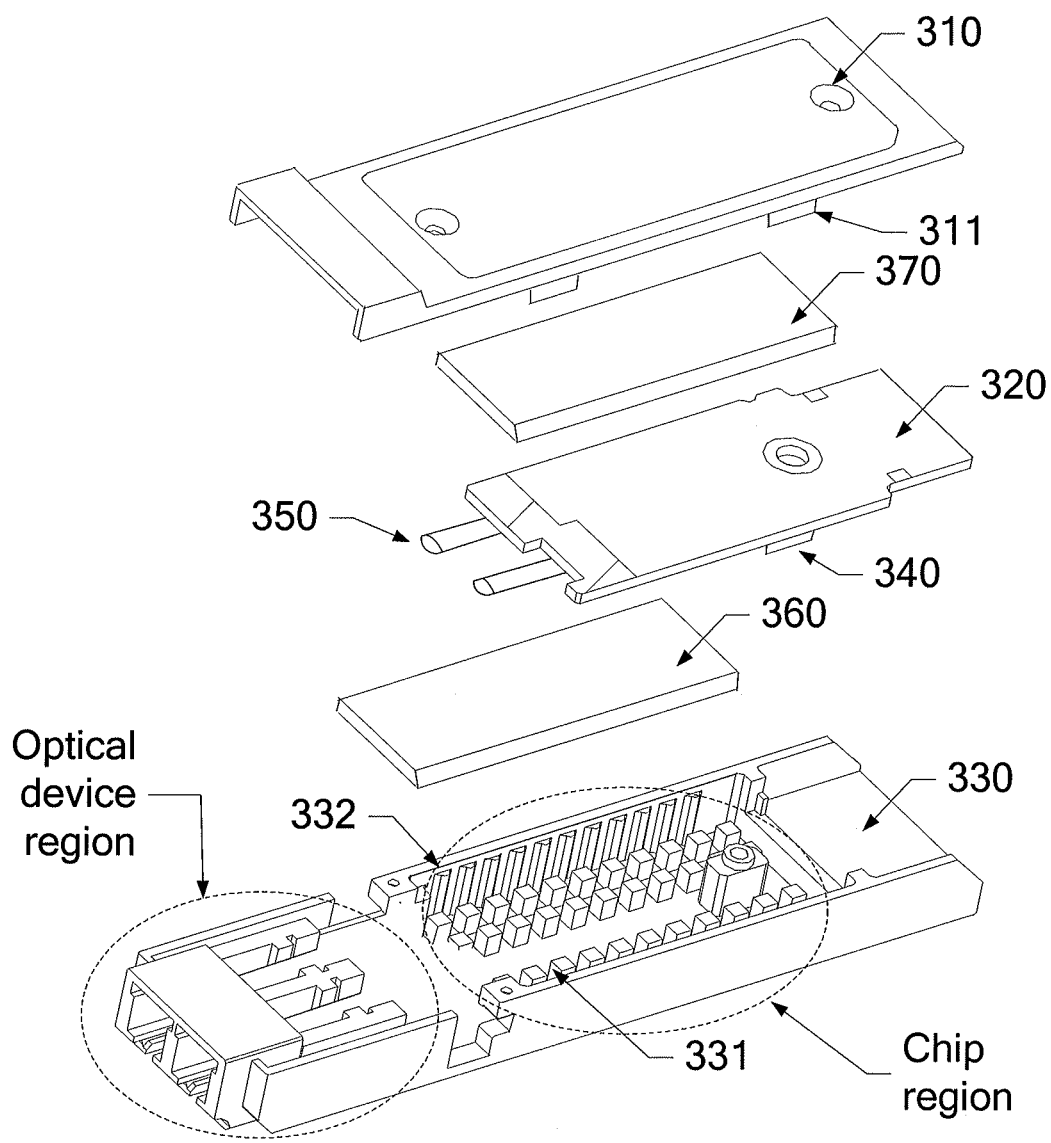
FIG. 4 is a schematic diagram depicting the structure of an optical module according to the second embodiment of the present disclosure.

Referring to FIG. 4, it is a schematic diagram depicting the structure of the optical module as provided by the second embodiment of the present disclosure.

The optical module as provided by the second embodiment of the present disclosure includes an upper housing 310, a printed circuit board 320, a lower housing 330, and an integrated chip 340 and an optical transceiver module 350 arranged on the printed circuit board, a first flexible thermally conductive component 360, and a second flexible thermally conductive component 370. The upper housing 310 and the lower housing 330 together form a space accommodating the printed circuit board 320, the integrated chip 340, and the optical transceiver module 350. The first flexible thermally conductive component 360 is disposed between the printed circuit board 320 and the lower housing 330. One surface of the first flexible thermally conductive component 360 is contacted with the integrated chip 340, and another surface of the first flexible thermally conductive component 360 is contacted with the lower housing 330. The difference between the first and second embodiments of the present disclosure lies in that the present embodiment of the disclosure further includes a second flexible thermally conductive component 370. The second flexible thermally conductive component 370 is situated between the upper housing 310 and the printed circuit board 320. One surface of the second flexible thermally conductive component 370 is contacted with the printed circuit board 320, and another surface of the second flexible thermally conductive component 370 is contacted with the upper housing 310.

As illustrated by the dotted regions in FIG. 4, in the chip region, the embodiments of the present disclosure use a first flexible thermally conductive material 360 to fully fill the space between the integrated chip 340 and the lower housing 330, and squeeze the air inside the optical module. Exploiting the heat conduction characteristics of the first flexible thermally conductive material 360, huge amounts of heat generated by the chip region may be isolated from the region of optical components. This mitigates the influence of the high temperature chip region on the low temperature standard optical devices. The embodiments of the present disclosure may enhance the temperature standard of the optical module and enhance the overall operating reliability.

Both the first and the second flexible thermally conductive components 360 and 370 may be heat-conducting gels, heat-conducting silicon greases, or heat-conducting fins, etc.

In the embodiments of the present disclosure, the integrated chip 340 is disposed on the surface of the printed circuit board 320, where the surface of the printed circuit board 320 is close to the first flexible thermally conductive component 360. Correspondingly, by providing the integrated chip 340 on the surface of the printed circuit board 320 distant from the first flexible thermally conductive component 360, the embodiments of the present disclosure may dissipate the heat generated by the integrated chip 340 through the first flexible thermally conductive component 360 and the lower housing 330, which further improves the heat dissipation performance.

The embodiments of the present disclosure fully fill the space between the integrated chip 340 and the lower housing 330 using the fluidity of the first thermally conductive component 360, and may squeeze the air inside the optical module, thus transferring the heat generated by the integrated chip 340 to the lower housing 330 and dissipating it. At the same time, the fluidity of the second thermally conductive component 370 may fully fill the space between the printed circuit board 320 and the upper housing 310, thus transferring the heat generated by the integrated chip 340 to the lower housing 330 and dissipating it. Therefore, the heat dissipation of the optical module as provided by the present embodiment of the disclosure is better, and its reliability is also higher.

In addition, the above-mentioned first and second flexible thermally conductive components also have very good amortization characteristics, capable of sufficiently protecting the components in the optical module and preventing them from being damaged in transmission and use. The plural protrusions 331 on the second surface of the lower housing 330 may be heat exchange teeth. By pressing against the first flexible thermally conductive component 360, the heat exchange teeth are entirely embedded into the first flexible thermally conductive component, thereby improving the heat dissipation of the optical module.

In the optical module as provided by the present embodiment of the disclosure, the first surface of the upper housing 310 includes at least one protrusions 311, where the first surface of the upper housing 310 is close to the printed circuit board 320. At the time of assembling the optical module, the upper housing 310 pushes up the printed circuit board 320 by the protrusions 311, thus pressing against the first flexible thermally conductive component 360 and the second flexible thermally conductive component 370, such that the first flexible thermally conductive component 360 and the second flexible thermally conductive component 370 respectively contact well with the printed circuit board 320. This may more effectively transfer the heat generated by the integrated chip 340. The number of the protrusions on the first surface of the upper housing 310 may be determined according to actual needs.

In the embodiments of the present disclosure, there are tooth-like protrusions 332 distributed on the third and fourth surfaces of the lower housing 330, where the third and fourth surfaces of the lower housing 330 are intersected with the second surface of the lower housing 330. The tooth-like protrusions 332 may be used for fixing the first flexible thermally conductive component 360, preventing the slippage thereof, improving the internal heat dissipation of the optical module, and enhancing the reliability of the optical module.

In the embodiments of the present disclosure, by providing a first flexible thermally conductive component 360 between the printed circuit board 320 and the lower housing 330, exploiting the fluidity of the first flexible thermally conductive component 360 for fully filling the space between the integrated chip 340 and the lower housing 330, the heat dissipation performance of the optical module is improved, and the reliability of the optical module is enhanced. Secondly, since the inner dissipation of the optical module is improved, it is not necessary to use current costly heat dissipation approaches for the heat dissipation outside the optical module, which lowers the heat dissipation cost. In addition, since the heat dissipation boss is cancelled in the embodiments of the present disclosure, there is no need to fabricate a complex boss. Therefore, the production efficiency may be increased remarkably, while at the same time the costs are significantly lowered. The present embodiment of the disclosure also improves the structure of the inner surface of the optical module's lower housing 330, for example adding the heat exchange teeth and the tooth-like protrusions. This may further improve the heat dissipation of the optical module, and may enhance the reliability of the optical module.

The embodiments of the present disclosure may be used for inner heat dissipation of other closed boxes except the optical module to solve the local hot spot problems of the devices within the closed boxes and the interplay of these devices when dissipating heat, thereby improving the inner heat dissipation efficiencies of the closed boxes.

Figure 5:
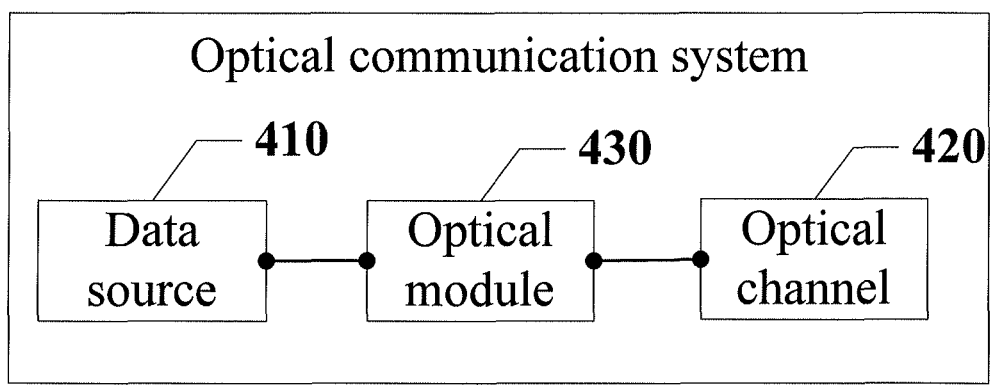
FIG. 5 is a schematic diagram depicting the structure of an optical communication system according to the embodiments of the present disclosure.

Referring to FIG. 5, it is a schematic diagram depicting the structure of an optical communication system as provided by the embodiments of the present disclosure.

The embodiments of the present disclosure further provide an optical communication system, which includes a data source 410, an optical channel 420, and an optical module 430. The specific structure of the optical module 430 is the same as the embodiment of the above optical module. For more details, please refer to the first and second embodiments of the above optical module. The data source 410 in the optical communication system is configured to transmit data signals to the optical module 430. The optical transceiver of the optical module 430 is configured to convert the data signals into optical signals and transmit the optical signals via the optical channel 420. The optical channel 420 may be an optical fiber.

Further, the optical transceiver of the optical module 430 in the optical communication system is further configured to receive the optical signals transmitted by the optical channel 420, and perform photo-electrical conversion on these optical signals. The optical transceiver module provided by the embodiments of the present disclosure may implement both photo-electrical conversion and electrical-photo conversion.

In the optical communication system provided by the embodiments of the present disclosure, a first flexible thermally conductive component is arranged between the printed circuit board and the lower housing of the optical module. By exploiting the fluidity of the first flexible thermally conductive component to fully fill the space between the integrated chip and the lower housing, and squeezing the air inside the optical module, the first flexible thermally conductive component may fully contact the printed circuit board and the integrated chip, thereby transferring in time the heat generated by the integrated chip to the lower housing and dissipating it. This improves the heat dissipation performance of the optical module, enhances its reliability, and while at the same time improves the reliability of the optical communication system.

In the foregoing, the optical module and the optical communication system provided by the embodiments of the present disclosure are described in detail. For those of ordinary skill in the art, modifications may be made to the embodiments and application contexts in accordance with the embodiments of the present disclosures. Therefore, the contents of the description should not be construed as limitation to the present disclosure.

What is claimed is:

1. An optical device comprising:
an upper housing, a printed circuit board, a lower housing, and an integrated chip and an optical transceiver module on the printed circuit board, a space between the upper housing and the lower housing accommodating the printed circuit board, the integrated chip, and the optical transceiver module; and
a first flexible thermally conductive component between the printed circuit board and the lower housing, wherein one surface of the first flexible thermally conductive component is contacted with the integrated chip, another surface of the first flexible thermally conductive component is contacted with the lower housing, and the two surfaces are opposite to each other, wherein a first surface of the upper housing comprises at least one protrusion which exerts pressure against the printed circuit board to facilitate thermal contact of the integrated chip to the one surface of the first flexible thermally conductive component.

2. The optical device according to claim 1, wherein the first surface of the upper housing is close to the printed circuit board.

3. The optical device according to claim 1, wherein a second surface of the lower housing comprises at least one protrusion, the protrusion on the second surface being used for supporting the first flexible thermally conductive component and the second surface of the lower housing is close to the first flexible thermally conductive component.

4. The optical device according to claim 3, wherein the protrusion on the second surface of the lower housing is a heat exchange tooth.

5. The optical device according to claim 3, wherein tooth-like protrusions are distributed on the third and fourth surfaces of the lower housing, the third and fourth surfaces of the lower housing are intersected with the second surface of the lower housing.

6. The optical device according to claim 1, further comprising:
a second flexible thermally conductive component, arranged between the printed circuit board and the upper housing, wherein one surface of the second flexible thermally conductive component is contacted with the printed circuit board, and another surface of the second flexible thermally conductive component is contacted with the upper housing.

7. The optical device according to claim 6, wherein:
the first flexible thermally conductive component and the second flexible thermally conductive component are heat-conducting gels, heat-conducting silicon greases, or heat-conducting fins.

8. The optical device according to claim 1, wherein:
the integrated chip is arranged on a surface of the printed circuit board, and the surface of the printed circuit board is close to the first flexible thermally conductive component.

9. An optical communication system comprising:
a data source and an optical channel,
wherein the system further comprises an optical module, and the optical module comprises an upper housing, a printed circuit board, a lower housing, and an integrated chip and an optical transceiver module arranged on the printed circuit board, the upper housing and the lower housing together forming a space accommodating the printed circuit board, the integrated chip, and the optical transceiver module,
wherein the optical module further comprises: a first flexible thermally conductive component, arranged between the printed circuit board and the lower housing; one surface of the first flexible thermally conductive component is contacted with the integrated chip, and another surface of the first flexible thermally conductive component is contacted with the lower housing, and the two surfaces are opposite to each other, wherein a first surface of the upper housing comprises at least one protrusion which exerts pressure against the printed circuit board to facilitate thermal contact of the integrated chip to the one surface of the first flexible thermally conductive component, and
wherein the data source is configured to transmit data signals to the optical module, and the optical transceiver module of the optical module is configured to convert the data signals into optical signals, and transmit the optical signals via the optical channel.

10. The optical communication system according to claim 9, wherein the optical transceiver module is further configured to receive the optical signals transmitted via the optical channel, and performs photoelectrical conversion on the received optical signals.

11. The optical communication system according to claim 9, wherein the first surface of the upper housing is close to the printed circuit board.

12. The optical communication system according to claim 9, wherein a second surface of the lower housing comprises at least one protrusion, the protrusion on the second surface being used for supporting the first flexible thermally conductive component, and the second surface of the lower housing is close to the first flexible thermally conductive component.

13. The optical communication system according to claim 12, wherein the protrusion on the second surface of the lower housing is a heat exchange tooth.

14. The optical communication system according to claim 12, wherein tooth-like protrusions are distributed on the third and fourth surfaces of the lower housing, the third and fourth surfaces of the lower housing are intersected with the second surface of the lower housing.

15. The optical communication system according to claim 9, wherein the optical module further comprises:
a second flexible thermally conductive component between the printed circuit board and the upper housing, wherein one surface of the second flexible thermally conductive component is contacted with the printed circuit board, and another surface of the second flexible thermally conductive component is contacted with the upper housing.

16. The optical communication system according to claim 15, wherein:
the first flexible thermally conductive component and the second flexible thermally conductive component are heat-conducting gels, heat-conducting silicon greases, or heat-conducting fins.

17. The optical communication system according to claim 9, wherein:
the integrated chip is arranged on a surface of the printed circuit board, and the surface of the printed circuit board is close to the first flexible thermally conductive component.

* * * * *